US008370747B2

(12) United States Patent
Foxenland

(10) Patent No.: US 8,370,747 B2
(45) Date of Patent: Feb. 5, 2013

(54) METHOD AND SYSTEM FOR ADAPTING A VISUAL USER INTERFACE OF A MOBILE RADIO TERMINAL IN COORDINATION WITH MUSIC

(75) Inventor: Eral D. Foxenland, Malmö (SE)

(73) Assignee: Sony Mobile Communications AB, Lund (SE)

( * ) Notice: Subject to any disclaimer, the term of this patent is extended or adjusted under 35 U.S.C. 154(b) by 1337 days.

(21) Appl. No.: 11/463,123

(22) Filed: Aug. 8, 2006

(65) Prior Publication Data

US 2008/0026690 A1 Jan. 31, 2008

Related U.S. Application Data

(60) Provisional application No. 60/820,813, filed on Jul. 31, 2006.

(51) Int. Cl.

| | |
|---|---|
| ***G11B 27/00*** | (2006.01) |
| ***G06F 3/00*** | (2006.01) |
| ***G06F 9/00*** | (2006.01) |
| ***G06F 17/00*** | (2006.01) |

(52) U.S. Cl. ......... 715/727; 715/726; 715/728; 715/864

(58) Field of Classification Search .................. 715/727, 715/726, 728, 864

See application file for complete search history.

(56) References Cited

U.S. PATENT DOCUMENTS

| | | | | |
|---|---|---|---|---|
| 6,972,363 | B2 * | 12/2005 | Georges et al. | 84/609 |
| 7,373,120 | B2 | 5/2008 | Messel et al. | |
| 2003/0100347 | A1 | 5/2003 | Okada et al. | |
| 2004/0137954 | A1 | 7/2004 | Engstrom et al. | |
| 2004/0168565 | A1 | 9/2004 | Nagao et al. | |
| 2005/0049005 | A1 | 3/2005 | Young et al. | |
| 2005/0070241 | A1 | 3/2005 | Northcutt et al. | |
| 2006/0161629 | A1 | 7/2006 | Cohen et al. | |
| 2006/0200842 | A1 | 9/2006 | Chapman et al. | |
| 2007/0010195 | A1 * | 1/2007 | Brown et al. | 455/3.06 |
| 2007/0202925 | A1 | 8/2007 | Beith | |

FOREIGN PATENT DOCUMENTS

| | | |
|---|---|---|
| EP | 1255418 | 11/2002 |
| EP | 1351197 | 10/2003 |
| GB | 2410637 | 8/2005 |
| JP | 11-112615 | 4/1999 |
| JP | 2000-293171 | 10/2000 |
| JP | 2001-166860 | 6/2001 |
| JP | 2003-060739 | 2/2003 |
| WO | 2008043581 | 4/2008 |

OTHER PUBLICATIONS

International Search Report from corresponding International Application No. PCT/IB07/000187.

International Preliminary Report on Patentability from corresponding International Application No. PCT/IB07/000187.

* cited by examiner

*Primary Examiner* — Boris Pesin

*Assistant Examiner* — Sabrina Greene

(74) *Attorney, Agent, or Firm* — Renner, Otto, Boisselle & Sklar, LLP

(57) ABSTRACT

A method of generating a multimedia user interface includes playing music with an electronic device; ascertaining a parameter associated with the music; and adapting visual content displayed on a display of the electronic device in conformance with the parameter of the music by applying a visual effect to the visual content, the visual effect having an association with the parameter.

26 Claims, 3 Drawing Sheets

10 34 14 20 16 36

METHOD AND SYSTEM FOR ADAPTING A VISUAL USER INTERFACE OF A MOBILE RADIO TERMINAL IN COORDINATION WITH MUSIC

RELATED APPLICATION DATA

The present application claims the benefit of U.S. Provisional Application Ser. No. 60/820,813, filed Jul. 31, 2006, the disclosure of which is herein incorporated by reference in its entirety.

TECHNICAL FIELD OF THE INVENTION

The present invention relates generally to electronic equipment, such as electronic equipment for engaging in voice communications and/or for playing audiovisual content. More particularly, the invention relates to a method and system for changing displayed content based on a parameter associated with the playback of music.

DESCRIPTION OF THE RELATED ART

Mobile and/or wireless electronic devices are becoming increasingly popular. For example, mobile telephones and portable media players are now in wide-spread use. In addition, the features associated with certain types of electronic devices have become increasingly diverse. To name a few examples, many electronic devices are capable of taking pictures, sending and receiving text messages, browsing the Internet, sending and receiving electronic mail, playing back video content, playing back audio content, displaying images, and interfacing to hands-free headsets.

Many electronic device users enjoy playing music with the electronic device while engaging in other activities with the electronic device. Other activities may include, playing games, sorting data, composing text messages, browsing the Internet, reading electronic mail messages and so forth. Conventionally, there is no relationship between the playback of music in the background and the performance of other activities. That is, the user may listen to the music played in the background, but is not otherwise influenced by the music.

SUMMARY

In view of the above-mentioned isolation between music playback and other electronic device activities, there is a need in the art to enhance the user's experience with electronic devices—and particularly portable handheld devices—by drawing a relationship between the music as it is played to the user and the visual content displayed to the user.

According to one aspect of the invention, a method of generating a multimedia user interface includes playing music with an electronic device; ascertaining a parameter associated with the music; and adapting visual content displayed on a display of the electronic device in conformance with the parameter of the music by applying a visual effect to the visual content, the visual effect having an association with the parameter.

According to one embodiment of the method, the parameter is ascertained by analyzing the music.

According to one embodiment of the method, the parameter is ascertained by reading data that is stored with or transmitted with audio data corresponding to the music.

According to one embodiment of the method, the parameter is volume of music playback.

According to one embodiment of the method, the visual effect is adjusting at least one of brightness or color of at least one displayed object.

According to one embodiment of the method, the parameter is related to rhythm of the music.

According to one embodiment of the method, the visual effect is adapting a moving object on the display.

According to one embodiment of the method, the moving object is moved with a relationship to the occurrence of a beat of the music.

According to one embodiment of the method, the visual effect is adapting a flashing object on the display.

According to one embodiment of the method, the flashing object is flashed with a relationship to the occurrence of a beat of the music.

According to one embodiment of the method, the visual effect is adapting a screen transition of content displayed on the display.

According to one embodiment of the method, the screen transition is carried out in steps having a relationship to a beat of the music.

According to one embodiment of the method, the visual effect is adapting at least one object displayed on the display to have a relationship with a beat of the music.

According to one embodiment of the method, the electronic device is a mobile telephone.

According to another aspect of the invention, a program stored on a machine-readable medium is configured to generate a multimedia user interface. The program includes executable logic to ascertain a parameter associated with music played by an electronic device; and adapt visual content displayed on a display of the electronic device in conformance with the parameter of the music by applying a visual effect to the visual content, the visual effect having an association with the parameter.

According to one embodiment of the program, the parameter is ascertained by one of analyzing the music or reading data that is stored with or transmitted with audio data corresponding to the music.

According to one embodiment of the program, the parameter is volume of music playback and the visual effect is adjusting at least one of brightness or color of at least one displayed object.

According to one embodiment of the program, the parameter is related to rhythm of the music and the visual effect is selected from adapting a moving object on the display, adapting a flashing object on the display, adapting a screen transition of content displayed on the display, adapting at least one object displayed on the display, and combinations thereof.

According to one embodiment of the program, the visual effect has a relationship to the occurrence of a beat of the music.

According to one embodiment of the program, the electronic device is a mobile telephone.

According to another aspect of the invention, an electronic device includes a display; and a control circuit that generates a multimedia user interface by executing logic to ascertain a parameter associated with music played back by the electronic device; and adapt visual content displayed on the display in conformance with the parameter of the music by applying a visual effect to the visual content, the visual effect having an association with the parameter.

According to one embodiment of the electronic device, the parameter is ascertained by one of analyzing the music or reading data that is stored with or transmitted with audio data corresponding to the music.

According to one embodiment of the electronic device, the parameter is volume of music playback and the visual effect is adjusting at least one of brightness or color of at least one displayed object.

According to one embodiment of the electronic device, the parameter is related to rhythm of the music and the visual effect is selected from adapting a moving object on the display, adapting a flashing object on the display, adapting a screen transition of content displayed on the display, adapting at least one object displayed on the display, and combinations thereof.

According to one embodiment of the electronic device, the visual effect has a relationship to the occurrence of a beat of the music.

According to one embodiment of the electronic device, the electronic device is a mobile telephone.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
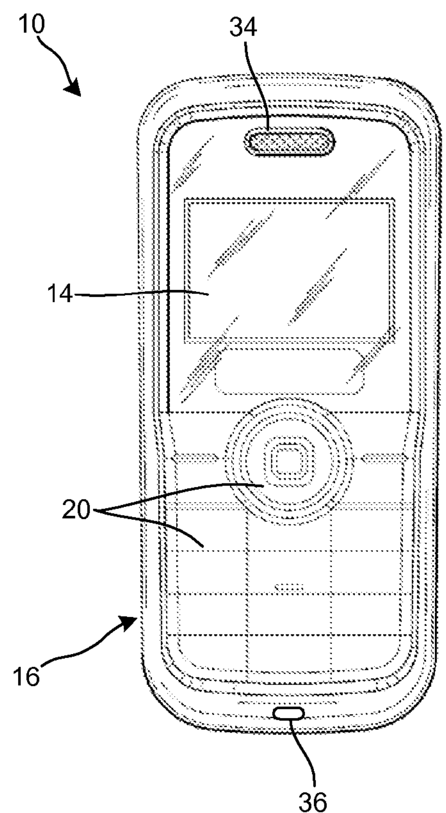
FIG. 1 is a schematic view of a mobile telephone as an exemplary electronic equipment in accordance with an embodiment of the present invention.

The present invention will now be described with reference to the drawings, wherein like reference numerals are used to refer to like elements throughout. It will be understood that the figures are not necessarily to scale.

The interchangeable terms "electronic equipment" and "electronic device" includes portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication apparatus or the like.

In the present application, the invention is described primarily in the context of a mobile telephone. However, it will be appreciated that the invention is not intended to be limited to a mobile telephone and can be any type of appropriate electronic equipment. Other electronic equipment to which the invention may be applied include, for example, portable media players, game players and computers.

Figure 2:
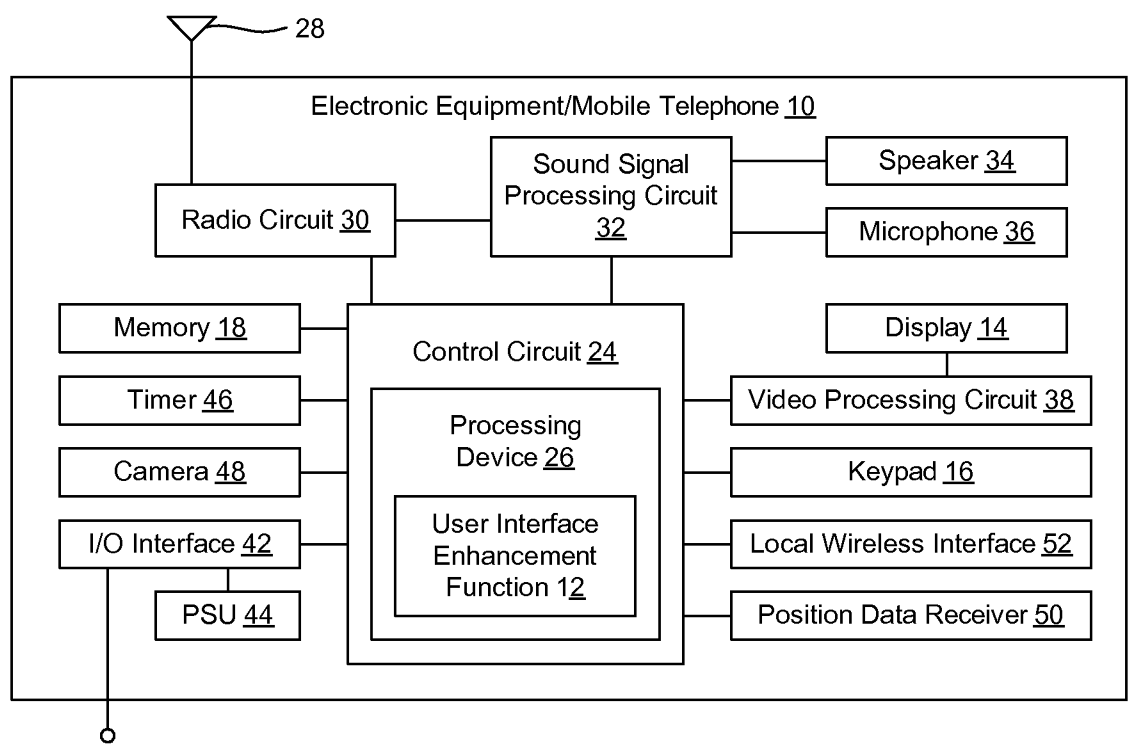
FIG. 2 is a schematic block diagram of the relevant portions of the mobile telephone of FIG. 1 in accordance with an embodiment of the present invention.

Referring initially to FIGS. 1 and 2, an electronic equipment 10 is shown. The electronic equipment 10 includes a user interface enhancement function 12 that is configured to establish a relationship between music that is audibly played back to the user and visual content that is displayed to the user. The relationship may be presented to the user as a visual effect and is intended to enhance user experience with the electronic equipment 10. Various visual effects are described below in greater detail. Also, the operation of the user interface enhancement function 12 will be described in greater detail below. It will be appreciated that the user interface enhancement function 12 may be embodied as executable code that may be resident in and executed by the electronic equipment 10. For instance, the user interface enhancement function 12 may be a program stored on a computer-readable or machine-readable medium.

The electronic equipment of the illustrated embodiment is a mobile telephone and will be referred to as the mobile telephone 10. The mobile telephone 10 is shown as having a brick or block form factor housing, but it will be appreciated that other type housings, such as a clamshell housing or a slide-type housing, may be utilized.

The mobile telephone 10 includes a display 14 and keypad 16. The display 14 displays information, graphical objects (e.g., a mouse pointer, icons, menu choices, etc.), alphanumeric data and images to a user, which enable the user to utilize the various features of the mobile telephone 10. The display 14 also may be used to visually display video content and/or images received by the mobile telephone 10 and/or retrieved from a memory 18 of the mobile telephone 10.

The keypad 16 provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc.

FIG. 2 represents a functional block diagram of the mobile telephone 10. For the sake of brevity, generally conventional features of the mobile telephone 10 will not be described in great detail herein. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out operation of the mobile telephone 10. The memory 18 may be, for example, one or more of a buffer, a flash memory, a hard drive, a removable media, a volatile memory, a non-volatile memory or other suitable device.

In addition, the processing device 26 executes code in order to perform the user interface enhancement function 12. It will be apparent to a person having ordinary skill in the art of computer programming, and specifically in application programming for mobile telephones or other electronic devices, how to program a mobile telephone 10 to operate and carry out the functions described herein. Accordingly, details as to the specific programming code have been left out for the sake of brevity. Also, while the user interface enhancement function 12 is executed by the processing device 26 in accordance with a preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system and may be used to send and receive data and/or audiovisual content. Radio circuits 30 for interaction with a mobile radio network and/or broadcasting network include, but are not limited to, GSM, CDMA, WCDMA, GPRS, MBMS, WiFi, WiMax, DVB-H, ISDB-T, etc as well as advanced versions of these standards.

The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation. Audio data, including music from an audio file stored by the memory 18 and retrieved by the control circuit 24 or a mobile radio service, may be passed from the control circuit 24 to the sound signal processing circuit 32 for playback to the user. The sound processing circuit 32 may include any appropriate buffers, decoders, amplifiers and so forth.

The mobile telephone 10 also includes the aforementioned display 14 and keypad 16 coupled to the control circuit 24. The display 14 may be coupled to the control circuit 24 by a video processing circuit 38 that converts video data to a video signal used to drive the display 14. The video data may be generated by the control circuit 24, retrieved from a video file that is stored in the memory 18, derived from an incoming video data stream received by the radio circuit 30 or obtained by any other suitable method. The video processing circuit 38 may include any appropriate buffers, decoders, video data signal processors and so forth.

The mobile telephone 10 further includes one or more I/O interface(s) 42. The I/O interface(s) 42 may be in the form of typical mobile telephone I/O interfaces and may include one or more electrical connectors. As is typical, the I/O interface (s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown), such as a headset (sometimes referred to as an earset) that audibly emits sounds in accordance with signals output by the sound processing circuit 34. Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 may also include a timer 46 for carrying out timing functions. Such functions may include timing the durations of calls, generating the content of time and date stamps, etc. The mobile telephone 10 may include a camera 48 for taking digital pictures and/or movies. Image and/or video files corresponding to the pictures and/or movies may be stored in the memory 18. The mobile telephone 10 also may include a position data receiver 50, such as a global positioning system (GPS) receiver, Galileo satellite system receiver or the like. The mobile telephone 10 also may include a local wireless interface 52, such as an infrared transceiver and/or an RF adaptor (e.g., a Bluetooth adapter), for establishing communication with an accessory, a hands-free adaptor (e.g., a headset that may audibly output sounds corresponding to audio data transferred from the mobile telephone 10 to the headset), another mobile radio terminal, a computer or another device.

The mobile telephone 10 may be configured to transmit, receive and process data, such as text messages (e.g., colloquially referred to as "an SMS"), electronic mail messages, multimedia messages (e.g., colloquially referred to as "an MMS"), image files, video files, audio files, ring tones, streaming audio, streaming video, data feeds (including podcasts) and so forth. Processing such data may include storing the data in the memory 18, executing applications to allow user interaction with data, displaying video and/or image content associated with the data, outputting audio sounds associated with the data and so forth.

Figure 3:
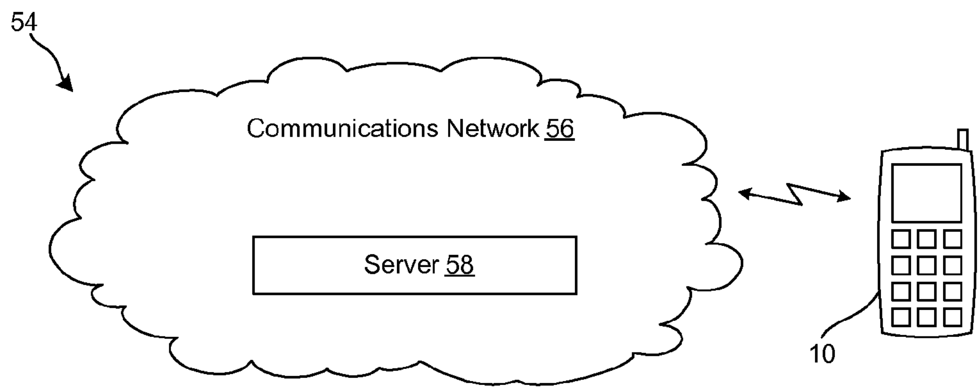
FIG. 3 is a schematic diagram of a communications system in which the mobile telephone of FIG. 1 may operate.

With additional reference to FIG. 3, the mobile telephone 10 may be configured to operate as part of a communications system 54. The system 54 may include a communications network 56 having a server 58 (or servers) for managing calls placed by and destined to the mobile telephone 10, transmitting data to the mobile telephone 10 and carrying out any other support functions. The server 58 communicates with the mobile telephone 10 via a transmission medium. As will be appreciated, the server 58 may be configured as a typical computer system used to carry out server functions and may include a processor configured to execute software containing logical instructions that embody the functions of the server 58. The transmission medium may be any appropriate device or assembly, including, for example, a communications tower (e.g., a cell tower), another mobile telephone, a wireless access point, a satellite, etc. Portions of the network may include wireless transmission pathways. Although only one mobile telephone 10 is depicted in FIG. 3, the network 56 may support the communications activity of multiple mobile telephones 10 and other types of end user devices.

As described above, the user interface enhancement function 12 may be executed to establish a relationship between music that is audibly played back to the user and visual content that is displayed to the user. The relationship may be presented to the user as a graphical visual effect so as to enhance the user's experience with the mobile telephone 10. The visual effects may relate to any manipulation of displayed content. One exemplary visual effect may be to change the color, hue, brightness, contrast, sharpness or other property of a displayed object or objects, including text, icons, background colors or graphics, symbols, the entire display and so forth. Another exemplary visual effect may be altering the motion of an object as the object moves across the display (14), such as by temporarily pausing, slowing down or speeding up the movement in coordination with the rhythm, tempo or pace of the music. Another exemplary visual effect may be changing the manner in which a cursor flashes, such as adapting the flashing to the rhythm of the music. Another exemplary visual effect is to modify the manner in which screen transitions are made, such as adapting the transition to the rhythm of the music. Still other exemplary visual effects include pulsing a displayed object, giving an object a glowing appearance, and presenting a glow or halo behind an object. It will be appreciated that the visual effects identified herein are examples and the invention defined by the claims appended hereto are not limited by the recitation of but a few examples of the effect or effects that could be used to draw a relationship between played audio and displayed visual content. Also, two or more effects may be combined to create another visual effect.

Aspects of the present invention are directed to applying visual effects to a visual user interface to adapt the visual interface to a property of music. The property of the music may relate to the rhythm, tempo or pace of the music, which may be measured, for example, in the frequency of beats. Another property may be the pitch of the music, such as the amount of bass relative to an amount of treble. Another property may be the volume at which the user plays back the music. Properties may be ascertained by analysis of the music. For instance, a software component of the user interface enhancement function 12 may analyze audio data corresponding to the music as it is played to detect beats and/or the frequency response of the music. In another embodiment, music files and/or streaming audio may include metadata (e.g., header information) that the user interface enhancement function 12 may read to determine the parameter.

The application of visual effects may be applied when music or other audio content is played back in the background while the user interacts with other functions of the mobile telephone 10. In addition, the application of visual effects may be applied when the audio output is synchronized with displayed video content, such as during operation of a game or during playback of audiovisual content (e.g., a music video, a mobile television channel, a video file, etc.).

The visual effects may be broken into three broad categories for discussion herein. It may be possible that a visual effect does not fit into one of these categories, but still may fall within the fair scope of the invention as set forth in claims appended hereto. The first category includes adapting a non-static object (e.g., a moving or flashing cursor, mouse pointer, icon, graphic, text, etc.) based on a parameter associated with the music, and will be described with respect to FIGS. 4 and 5. The second category includes adapting a screen transition based on a parameter associated with the music, and will be described with respect to FIG. 6. The third category includes adapting the entire displayed content or a portion of displayed content based on a parameter associated with the music.

Figure 4:
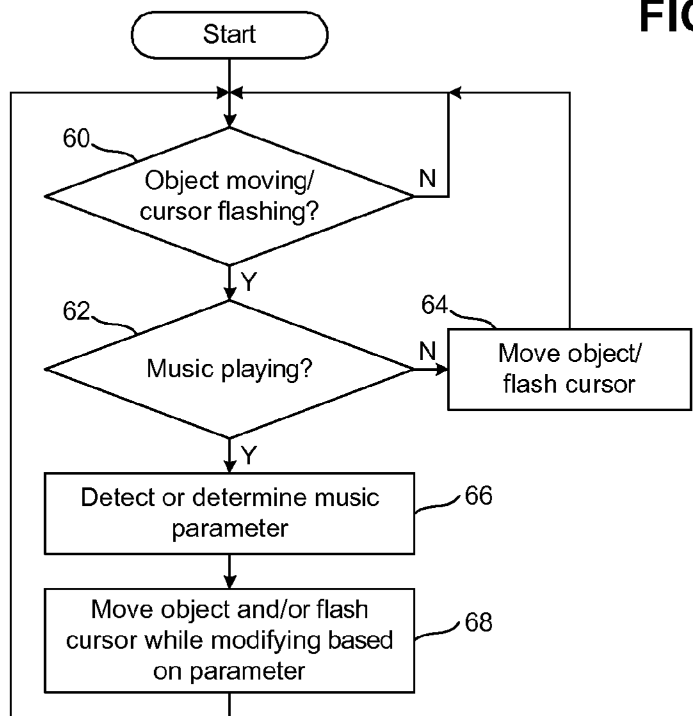
FIG. 4 is a flow chart depicting an exemplary method of generating an interaction between music that is played back to a user of the electronic equipment and visual content displayed to the user.

With reference to FIG. 4, illustrated is a flow chart of exemplary logical operations performed by the mobile telephone 10 when executing the user interface enhancement function 12. FIG. 4 may be thought of as depicting steps of a method carried out by the mobile telephone 10. Although FIG. 4 shows a specific order of executing functional logic blocks, the order of execution of the blocks may be changed relative to the order shown. Also, two or more blocks shown in succession may be executed concurrently or with partial concurrence. Certain blocks may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The logical flow may commence in block 60 where a determination is made as to whether an object (e.g., a cursor, a mouse pointer, an icon, a graphic, text, etc.) on the display 14 is moving or if an object (e.g., a cursor) on the display 14 is flashing to gain the user's attention. The object may be moving or flashing based on a user input or operation of a process carried out by the mobile telephone 10. If no object is flashing or moving, a negative determination may be made in block 60 and the logical flow may wait until a positive determination is made. If an object is moving or flashing, a positive determination may be made in block 60 and the logical flow may proceed to block 62.

In block 62 a determination is made as to whether music or other audio content is played back to the user. If music is not played back, a negative determination may be made in block 62 and the logical flow may progress to block 64. In block 64, the object may be moved or flashed using default settings. For instance, default movement of a mouse pointer may involve moving the pointer at a uniform rate across the display 14 from a starting point to an ending point. Default flashing of a cursor may involve a cyclic display of the cursor where the length of time that the cursor is displayed during each cycle and the cyclic period are constant.

If music is playing in block 62, a positive determination may be made and the logical flow may proceed to block 66. In block 66, a parameter associated with the music and applicable to a visual effect to be applied to the moving or flashing object may be ascertained. The parameter may be ascertained by detecting the parameter (e.g., by analysis of the music or a user setting associated with the music playback) or by determining the parameter (e.g., by reading metadata or header data associated with the music). Ascertaining the parameter may be made on an ongoing basis, such as the identification of the occurrence of a series of beats. The particular parameter (or parameters) that is ascertained may depend on the visual effect to be applied. Example parameters include, but are not limited to, the occurrence or frequency of musical beats, a rhythmic bass component, a pitch, playback volume, presence or absence of lyrics, and so on.

Next, in block 68, the parameter is applied to the movement of the object or the flashing of the object to generate the visual effect. For instance, if an object were moved across the display 14, the movement may be stopped, sped up and/or slowed downed in pace with the music.

Figure 5:
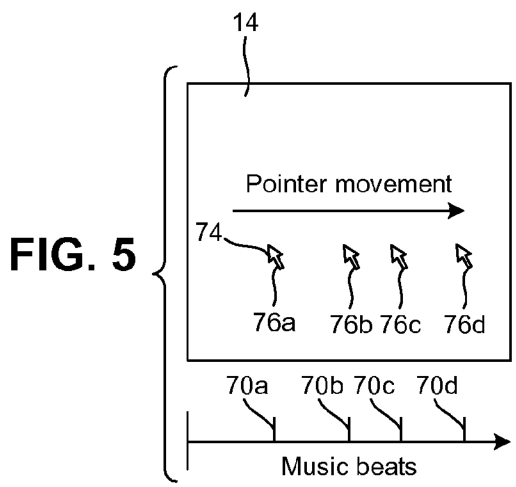
FIG. 5 is a schematic representation of an exemplary relationship between music and visual content.

With additional reference to FIG. 5, an exemplary application of a parameter to a moving object is depicted. In FIG. 5, the parameter is the occurrence of beats. The occurrence of a beat is represented by a hash-mark 70 along time line 72. The moving object is a pointer 74, which is depicted as moving from left to right. With each beat 70, the pointer 74 is momentarily shown as being stopped or slowed in its location at the time of the corresponding beat 70. Thus, at beat 70*a*, the pointer 74 may be positioned, and temporarily stop or slow, at a location 76*a*. At a next beat 70*b*, the pointer may be positioned, and temporarily stop or slow, at a location 76*b*, and so on through subsequent beat and position pairs 70*c*/76*c*, 70*d*/76*d*, etc., until the pointer 74 reaches an ending location. Between locations 76, the pointer 74 may be displayed as moving at a constant rate or not shown. The stopping or slowing of the pointer 74 may be made for about a tenth of a second for each beat or may be made for the duration of the beat.

In variations of this example, the pointer 74 (or other object to which the visual effect is applied) may be shown as being larger or smaller for each beat 70, may be shown in a different color for each beat 70, may be shown as being brighter or dimmer for each beat 70, may vibrate at each beat 70, and so on.

As one of ordinary skill in the art will appreciate the example of FIG. 5 may be applied to a flashing object. For instance, a flashing object (e.g., a cursor) may be shown at the occurrence of each beat, or undergo any other visual effect with the occurrence of the beats 70. Also, the example of FIG. 5 may be applied to an otherwise statically displayed object. For instance, an icon, graphic, pointer, selected or highlighted item, or other object may be made to flash, disappear, change color, change size, jump, vibrate, pulse or otherwise undergo a change in visual appearance in coordination with the beats 70.

As will be appreciated, the illustration of FIG. 5 is but one example of the application of a specific music parameter (the occurrence of beats) to a specific object (a moving pointer 74). Similar adaptations of this parameter or other parameters to moving, static and/or flashing objects will be apparent to one of ordinary skill in the art.

Following blocks 64 and 68, the logical flow may return to block 60 to repeat the process, or may end.

Figure 6:
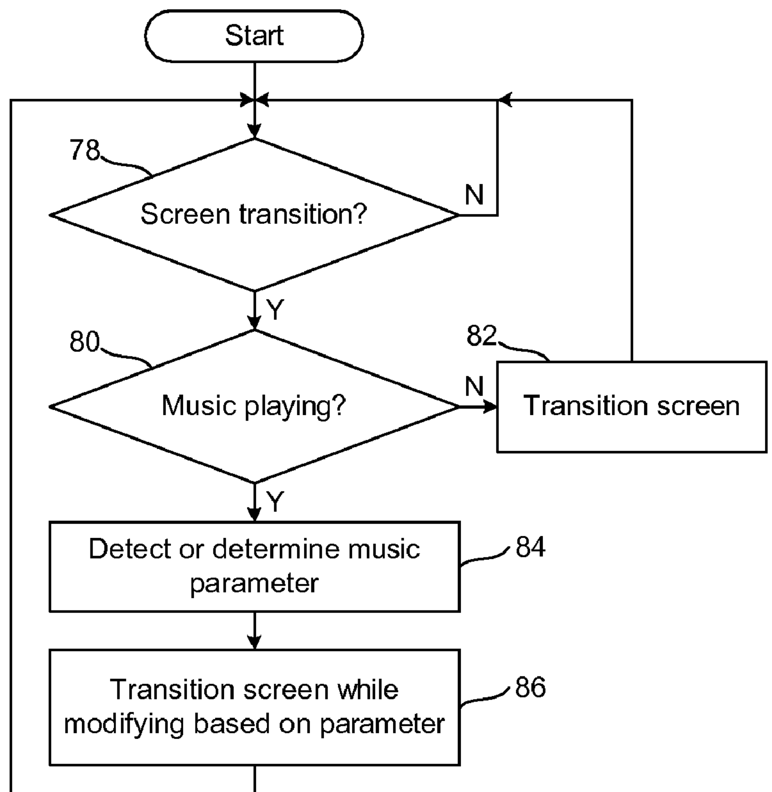
FIG. 6 is a flow chart depicting another exemplary method of generating an interaction between music that is played back to a user of the electronic equipment and visual content displayed to the user.

With reference to FIG. 6, illustrated is a flow chart of exemplary logical operations performed by the mobile telephone 10 when executing the user interface enhancement function 12. FIG. 6 may be thought of as depicting steps of a method carried out by the mobile telephone 10. Although FIG. 6 shows a specific order of executing functional logic blocks, the order of execution of the blocks may be changed relative to the order shown. Also, two or more blocks shown in succession may be executed concurrently or with partial concurrence. Certain blocks may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The logical flow illustrated in FIG. 6 has similarity to the logical flow illustrated by FIG. 4. For the sake of brevity, processing that was described for logical operations with respect to FIG. 4 and that are applicable to the logical operation illustrated in FIG. 6 will only be briefly described.

The logical flow of FIG. 6 may commence in block 78 where a determination is made as to whether there is a call for a screen transition. A screen transition is a change from displaying one arrangement of content to another arrangement of content. Screen transitions may occur when changing applications or within an application. If no screen transition is called for, a negative determination may be made in block 78 and the logical flow may wait until a positive determination is made. If a screen transition is called for, a positive determination may be made in block 78 and the logical flow may proceed to block 80.

In block 80 a determination is made as to whether music or other audio content is played back to the user. If music is not played back, a negative determination may be made in block 80 and the logical flow may progress to block 82. In block 82, the screen transition may be made using default settings (e.g., a smooth transition over a set time period or an instant transition).

If music is playing in block 80, a positive determination may be made and the logical flow may proceed to block 84. In block 84, a parameter associated with the music and applicable to a visual effect to be applied to the screen transition may be ascertained. The parameter may be ascertained in any appropriate manner, such as the manners described with respect to block 66 of FIG. 4.

Next, in block 86, the parameter is applied to the screen transition. For instance, during the screen transition, the displayed content may be changed in a series of steps. For each step, the whole screen or portions of the screen (e.g., select squares from a fine checkerboard arrangement or random groups of pixels) of the screen may be changed. For instance, the displayed content may be morphed from one screen to another in steps that are in rhythm to the music. The initiation of one step and/or the ending of a step may be timed to the beat of the music. Thus, when relatively fast music is played, the total transition may be accomplished more quickly than when slower music is played. Also, for slower music or for music played at low volume, screen transitions may be made in a smooth, flowing transition. In some embodiment, intermediate screen graphics or colors may be introduced as a step or steps during the transition.

Following blocks 82 and 86, the logical flow may return to block 78 to repeat the process, or may end.

Figure 7:
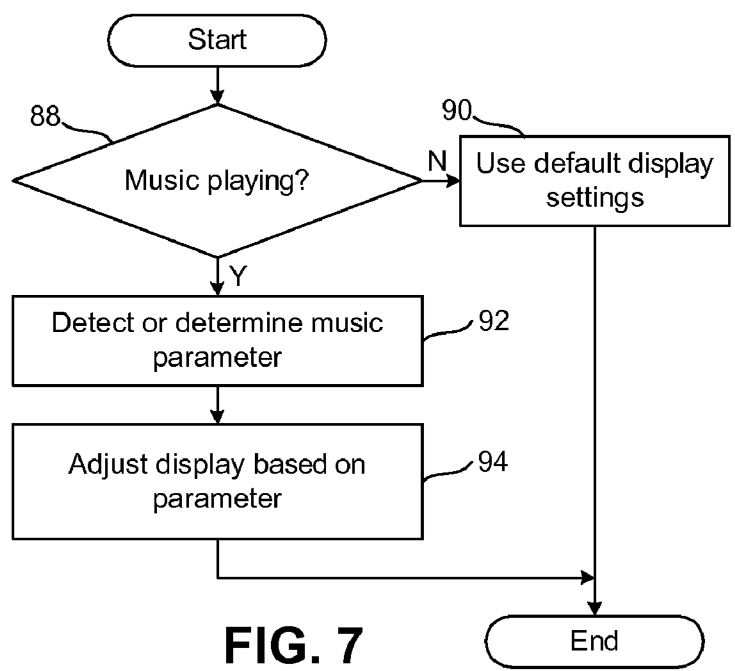
FIG. 7 is a flow chart depicting yet another exemplary method of generating an interaction between music that is played back to a user of the electronic equipment and visual content displayed to the user.

With reference to FIG. 7, illustrated is a flow chart of exemplary logical operations performed by the mobile telephone 10 when executing the user interface enhancement function 12. FIG. 7 may be thought of as depicting steps of a method carried out by the mobile telephone 10. Although FIG. 7 shows a specific order of executing functional logic blocks, the order of execution of the blocks may be changed relative to the order shown. Also, two or more blocks shown in succession may be executed concurrently or with partial concurrence. Certain blocks may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The logical flow illustrated in FIG. 7 has similarity to the logical flows illustrated by FIGS. 4 and 6. For the sake of brevity, processing that was described for logical operations with respect to FIGS. 4 and 6 and that are applicable to the logical operation illustrated in FIG. 7 will only be briefly described.

The logical flow of FIG. 7 may commence in block 88 where a determination is made as to whether music or other audio content is played back to the user. If music is not played back, a negative determination may be made in block 88 and the logical flow may progress to block 90. In block 90, the display of content on the display 14 is made using default settings (e.g., normal brightness, color saturation and sharpness settings).

If music is playing in block 88, a positive determination may be made and the logical flow may proceed to block 92. In block 92, a parameter associated with the music and applicable to the visual effect to be applied to the displayed content may be ascertained. The parameter may be ascertained in any appropriate manner, such as the manners described with respect to block 66 of FIG. 4.

Next, in block 94, the parameter is applied to the display. For instance, the parameter may be volume of the music playback and, in response to playback volume, the intensity of the display may be adjusted. If the volume is set a relatively high setting, the brightness of display, intensity of the colors presented on the display, and/or sharpness may be increased. Thus, the display is adapted in a manner that corresponds to the heightened, more intense music experience that is associated with higher volume music playback. If the volume is relatively low, the displayed content may be presented using default settings or with reduced display settings (e.g., brightness, contrast, etc.). Also, selection of colors (e.g., background color(s), menu and screen theme colors, and so forth) may be based on volume or other music parameter (e.g., music tempo). The adjustment of the displayed content may be made to the entire display 14 or a portion of the display 14. The adjustment to the display may be persistent during the music playback or may be correlated to the rhythm of the music (e.g., brightness or sharpness may be intensified, or colors may change in correspondence to beats of the music). Portions of the display 14 may include a selected item (e.g., icon or contact list entry), a background, menu choices, and so forth.

Following blocks 90 and 94, the logical flow may end or return to block 88 to repeat the process.

In the foregoing description, various exemplary parameters used to adjust display characteristics have been presented. Also presented were various exemplary visual effects. It will be appreciated that parameters and visual effects that are described and/or illustrated with respect to one embodiment may be used in the same way or in a similar way in one or more other embodiments and/or in combination with or instead of the recited parameters and/or visual effects The user interface enhancement function 12 may generate visual feedback to the user that supplements music played to the user through the speaker 34 or a headset (not shown). Thus, the enhancement functions described herein heighten the user's music experience while allowing the user to engage in various other tasks (e.g., reading or preparing text messages, watching video, sorting data, reading or preparing electronic mail messages, browsing the Internet, etc.). The user's interactive experience with the electronic device may be more robust by applying parameter(s) associated with background music to navigation and other visual-based operations of the electronic device. Also, there is a known phenomenon that a person's movement pattern may change with the speed of music to which the user is listening. The visual effects may strengthen this known phenomenon by providing additional sensory feedback to the user that is coordinated with the music.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of generating a multimedia user interface, comprising:

playing background music with an electronic device;

ascertaining a parameter associated with the music; and adapting visual content of a graphical user interface through which a user commands performance of an electronic device function unrelated to the music and that is displayed on a display of the electronic device in conformance with the parameter of the music by applying a visual effect to the visual content, the visual effect having an association with the parameter.

2. The method of claim 1, wherein the parameter is ascertained by analyzing the music.

3. The method of claim 1, wherein the parameter is ascertained by reading data that is stored with or transmitted with audio data corresponding to the music.

4. The method of claim 1, wherein the parameter is volume of music playback.

5. The method of claim 4, wherein the visual effect is adjusting at least one of brightness or color of at least one displayed object.

6. The method of claim 1, wherein the parameter is related to rhythm of the music.

7. The method of claim 6, wherein the visual effect is adapting a moving object on the display.

8. The method of claim 7, wherein the moving object is moved with a relationship to the occurrence of a beat of the music.

9. The method of claim 6, wherein the visual effect is adapting a flashing object on the display.

10. The method of claim 9, wherein the flashing object is flashed with a relationship to the occurrence of a beat of the music.

11. The method of claim 6, wherein the visual effect is adapting a screen transition of content displayed on the display.

12. The method of claim 11, where the screen transition is carried out in steps having a relationship to a beat of the music.

13. The method of claim 6, wherein the visual effect is adapting at least one object displayed on the display to have a relationship with a beat of the music.

14. The method of claim 1, wherein the electronic device is a mobile telephone.

15. The method of claim 1, wherein the electronic device function unrelated to the music is a messaging function and the visual effect is at least one of adapting cursor behavior to the parameter, adapting a screen transition to the parameter, adapting a moving object to the parameter, or adapting a flashing object to the parameter.

16. The method of claim 1, wherein the electronic device function unrelated to the music is an internet browsing function and the visual effect is at least one of adapting cursor behavior to the parameter, adapting a screen transition to the parameter, adapting a moving object to the parameter, or adapting a flashing object to the parameter.

17. The method of claim 1, wherein the electronic device function unrelated to the music is a gaming function and the visual effect is at least one of adapting cursor behavior to the parameter, adapting a screen transition to the parameter, adapting a moving object to the parameter, or adapting a flashing object to the parameter.

18. An electronic device, comprising:

a display; and a control circuit that generates a multimedia user interface by executing logic to:

ascertain a parameter associated with background music played back by the electronic device; and adapt visual content of a graphical user interface through which a user commands performance of an electronic device function unrelated to the music and that is displayed on the display in conformance with the parameter of the music by applying a visual effect to the visual content, the visual effect having an association with the parameter.

19. The electronic device of claim 18, wherein the parameter is ascertained by one of analyzing the music or reading data that is stored with or transmitted with audio data corresponding to the music.

20. The electronic device of claim 18, wherein the parameter is volume of music playback and the visual effect is adjusting at least one of brightness or color of at least one displayed object.

21. The electronic device of claim 18, wherein the parameter is related to rhythm of the music and the visual effect is selected from adapting a moving object on the display, adapting a flashing object on the display, adapting a screen transition of content displayed on the display, adapting at least one object displayed on the display, and combinations thereof.

22. The electronic device of claim 21, wherein the visual effect has a relationship to the occurrence of a beat of the music.

23. The electronic device of claim 18, wherein the electronic device is a mobile telephone.

24. The electronic device of claim 18, wherein the electronic device function unrelated to the music is a messaging function and the visual effect is at least one of adapting cursor behavior to the parameter, adapting a screen transition to the parameter, adapting a moving object to the parameter, or adapting a flashing object to the parameter.

25. The electronic device of claim 18, wherein the electronic device function unrelated to the music is an internet browsing function and the visual effect is at least one of adapting cursor behavior to the parameter, adapting a screen transition to the parameter, adapting a moving object to the parameter, or adapting a flashing object to the parameter.

26. The electronic device of claim 18, wherein the electronic device function unrelated to the music is a gaming function and the visual effect is at least one of adapting cursor behavior to the parameter, adapting a screen transition to the parameter, adapting a moving object to the parameter, or adapting a flashing object to the parameter.

* * * * *